(12) United States Patent
Mohebbi

(10) Patent No.: US 8,643,484 B2
(45) Date of Patent: Feb. 4, 2014

(54) VISUAL ALERT SYSTEM FOR SET-TOP BOX STANDBY MODE

(75) Inventor: IKouroush Mohebbi, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 724 days.

(21) Appl. No.: 12/448,290

(22) PCT Filed: Dec. 20, 2006

(86) PCT No.: PCT/US2006/048618
§ 371 (c)(1),
(2), (4) Date: Jun. 16, 2009

(87) PCT Pub. No.: WO2008/079110
PCT Pub. Date: Jul. 3, 2008

(65) Prior Publication Data
US 2010/0039251 A1 Feb. 18, 2010

(51) Int. Cl.
*G08B 23/00* (2006.01)
*G08B 5/00* (2006.01)
*H04N 7/173* (2011.01)

(52) U.S. Cl.
USPC .......... 340/501; 340/815.4; 340/815.45; 340/691.1; 340/7.48; 340/7.58; 340/7.61; 725/33; 725/131; 725/151

(58) Field of Classification Search
USPC ............................ 340/501; 725/33
See application file for complete search history.

(56) References Cited

U.S. PATENT DOCUMENTS

| 5,982,363 | A | 11/1999 | Naiff |
| 6,147,714 | A * | 11/2000 | Terasawa et al. ............. 348/564 |
| 2004/0174326 | A1 | 9/2004 | Yamamoto et al. |
| 2004/0196151 | A1* | 10/2004 | Smith ...................... 340/539.17 |
| 2005/0030977 | A1* | 2/2005 | Casey et al. .................... 370/485 |
| 2005/0229206 | A1 | 10/2005 | Pugel et al. |
| 2005/0289610 | A1* | 12/2005 | Takagi et al. ................... 725/72 |
| 2006/0055527 | A1* | 3/2006 | Pugel ........................... 340/517 |

FOREIGN PATENT DOCUMENTS

| JP | 2005-079753 | A | 3/2005 |
| JP | 2005-250738 | A | 9/2005 |
| JP | 2005-530380 | A | 10/2005 |
| JP | 2006-330708 | A | 12/2006 |
| KR | 1999000646 | | 1/1999 |
| KR | 2004-0106516 | A | 12/2004 |
| KR | 2005-0088099 | A | 9/2005 |
| WO | 9935831 | A1 | 7/1999 |
| WO | WO02087238 | * | 10/2002 |
| WO | 03/096672 | A2 | 11/2003 |
| WO | 20041047429 | A1 | 6/2004 |
| WO | 20041054227 | A2 | 6/2004 |

* cited by examiner

*Primary Examiner* — Donnie Crosland
(74) *Attorney, Agent, or Firm* — Robert D. Shedd; Richard LaPeruta

(57) ABSTRACT

A visual display system for a set-top box is includes a source of event data, a light emitting diode display adapted to display event data to a user in a standby mode of operation, and a main processor configured to receive event data and control the light emitting diode display in response to the received event data.

20 Claims, 2 Drawing Sheets

VISUAL ALERT SYSTEM FOR SET-TOP BOX STANDBY MODE

This application claims the benefit, under 35 U.S.C. §365 of International Application PCT/US2006/048618 filed Dec. 20, 2006, which was published in accordance with PCT Article 21(2) on Jul. 3, 2008 in English.

FIELD OF THE INVENTION

The invention relates generally to media receiver set-top boxes. More specifically, the invention relates to visual alert systems for media receiver set-top boxes.

BACKGROUND OF THE INVENTION

A myriad of media receiver set-top boxes well suited for receiving audio-visual (hereinafter referred to as A/V) signals through satellite, cable and other delivery systems are well known in the art. The known set-top boxes are typically operable in two primary modes, a powered-on mode and a standby mode. Set-top boxes are typically switched between the powered-on mode and the standby mode through the use of a set-top box remote controller or through the use of buttons or switches carried by the set-top box. The button on the set-top box and remote controller used to switch between the modes is commonly labeled "Power".

While operating in the powered-on mode, set-top boxes are typically fully functioning and capable of delivering A/V media to A/V systems devices or systems such as televisions, audio receivers/amplifiers, computers, projectors, and many other well-known devices suitable for interfacing with set-top boxes. Also, while in the powered-on mode, the user may be able to interact with the set-top box for the purpose of controlling current and future activities of the set-top box, typically through the use of on-screen video menu systems and related prompts. An example of current activities to be controlled is the selection of and subsequent display of a particular channel or broadcast content which may be accomplished through the use of the set-top box remote controller or through the use of the buttons or switches carried on the set-top box, typically on a front panel of the set-top box.

In the standby mode, a set-top box is typically considered inactive insofar as it does not generate output to connected A/V systems; however, many set-top boxes remain functional for a variety of other tasks while in standby mode. For example, while some set-top boxes with integrated digital video recording capability (hereinafter referred to as "DVR capability") are in standby mode, the set-top box may, without instruction or interaction from a user, execute a previously requested course of action such as recording a particular broadcast channel for a particular length of time. Some set-top boxes incorporate a front panel display light which alerts the user to the fact that the set-top box is in fact recording even while the set-top box is in standby mode. Other set-top boxes incorporate a front panel display light which alerts the user to the fact that an electronic message is ready for retrieval through the system menu of the set-top box, even while the set-top box is in standby mode.

Other means of switching between the powered-on mode and the standby mode is through the use of a preprogrammed event system integrated into the control system of the set-top box. The preprogrammed event systems are generally capable of receiving, storing, and executing events which are specified by a user and which are to take place at some time in the future. For example, a user may request (through the use of an on-screen menu system or the like) that the set-top box automatically switch from the standby mode to the powered-on mode, tune to a particular channel, and display that channel on the connected A/V display systems. Similarly, the user may request that the set-top box automatically switch from the powered-on mode to the standby mode after a particular amount of run time or after a period of inactivity determined by a lack of interaction between the user and the set-top box. These are only two of a plethora of commonly known examples of how set-top boxes are currently used which involves being switched between the powered-on and the standby mode.

While there are many advanced set-top boxes known in the art, current set-top boxes do not perform well in the area of communicating information to the user through the use of set-top box visual displays even while the set-top box is in standby mode. Further, while current set-top boxes are often fixtures of homes and businesses where aesthetic preferences are paramount, current set-top boxes do not perform well in the area adding value to the decorative or visually pleasant nature of the environment in which they are installed.

It is therefore desirable to develop a set-top box with improved capability for communicating information to the user and with improved aesthetics, even while the set-top box is in standby mode.

SUMMARY OF THE INVENTION

A visual display system for a set-top box is includes a source of event data, a light emitting diode display, and a main processor configured to receive event data and control the light emitting diode display in response to the received event data.

The set-top box comprises a powered-on mode of operation capability and a standby mode of operation capability.

DETAILED DESCRIPTION OF THE INVENTION

Figure 1:
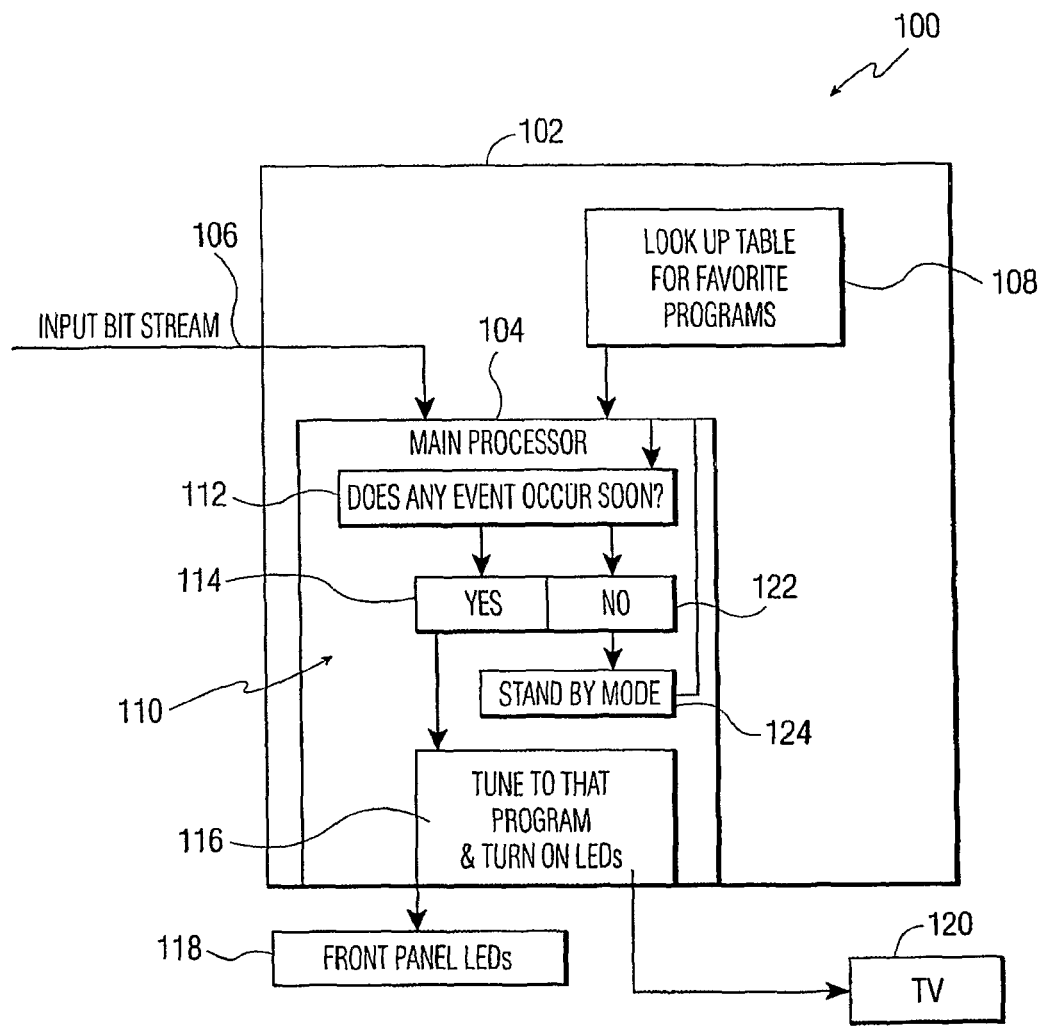
FIG. 1 is a schematic illustration of a set-top box visual alert system according to a first embodiment of the present invention.

Referring now to FIG. 1 in the drawings, a visual alert system according to a first embodiment of the present invention is illustrated. Visual alert system 100 comprises a set-top box 102 having a main processor 104 capable of receiving and decoding an input bit stream 106. Input bit stream 106 generally carries data necessary for recreating an A/V signal for subsequent output from the set-top box 102. Set-top box 102 further comprises a look up table for favorite programs 108 which is populated either from bit stream 106, from a programming service which supplies such data for a fee separate from the provider of the bit stream 106, or from the user in previous interactions between the user and the set-top box 102. Generally, the visual alert system 100 is capable of using information stored in the look up table 108, bit stream 106, or elsewhere, to trigger desired front panel light emitting diode (hereinafter referred to as LED) display 118 effects. The data stored in table 108 is also used to trigger the provision of A/V signals to A/V devices such as television 120. The main processor 104 comprises a decision and action process 110 which decides how to control a tuner (not shown) of the set-top box and the front panel LED display 118.

Front panel LED display 118 is generally a plurality of full color LEDs capable of varying color, brightness, and on/off states in a manner providing both functional and aesthetic qualities to the set-top box 104. The color, brightness, and on/off state of each of the LEDs is controlled by the main processor 104 in response to data cues from a variety of sources.

The main processor 104 is generally capable of controlling the LED display 118 in reaction to a variety of types of data and from a variety of data sources. For example, bit stream 106 may contain event data related to weather (such as thunder storm, tornado, hurricane, bail, extreme beat, or the like), holidays and seasonal events (such as Christmas day, Saint Patrick's Day, Independence Day, or the like), or so-called "hot-news" (such as presidential addresses, election results, so-called "Amber alerts" for notifying the public of missing children, community events, newsworthy catastrophes, and the like). Similarly, event data may be provided by table 108 which may be populated with data from a variety of sources, including bit stream 106. Regardless of the source, bit stream 106, table 108, or otherwise, the processor 104 may have special LED display effects preprogrammed into the processor 104 or may alternatively accept LED display effects from any of the same sources of event data described above.

In response to the event data provided to the processor 104, the processor 104 may control the LEDs 118 in a manner which is intuitively recognizable by the user of visual alert system 100 as being associated with the type of event occurring and triggering the use of the LED display 118. For example, in the case of a local fire, the processor 104 may be instructed to control the LED display 118 such that the full color LEDs appear to display an active red flame. Similarly, if snow is forecasted and is used by the processor as an event for controlling the LEDs 118, the full color LEDs may be controlled by the processor to show individual white colored snow flakes moving from the top of the display 118 to the bottom of the display 118 as if snow were falling. Similarly, if a local catastrophe has injured many people, a red cross may be displayed to signify that an event which may properly be responded to by humanitarian organization such as the International Red Cross has occurred or is occurring.

Further, the main processor 104 may be programmed to respond to season events by controlling the LED display 118 to emit seasonal colors and/or designs For example, when reacting to event data which indicates Independence Day, a red, white, and blue flag may be displayed by display 118. Of course, as each country has its own national holidays and associated colors and symbols, the particular event dates, colors, symbols are the type of variable data which may be selectively supplied to set-top boxes based on geographic limitations such that only applicable holidays and culturally appropriate seasons and events are displayed. Further, the LED display 118 can either be controlled by the main processor 104 as in the current embodiment, or in other embodiments of the invention, dedicated micro-controllers (not shown) with EEPROM or Flash Memory may be used to control the display 118. Where the LED display 118 is controlled by a dedicated micro-controller, the software routine or decision process 110 responsible for controlling the LEDs 118 in response to event data may reside in the dedicated micro-controller memory.

Further, LED display 118 may be used to inform a user that a particular program of interest (the program having been indicated as a show of interest through known means such as a menu system for auto-tuning selection or for DVR functionality) is currently showing or recording even while the set-top box 102 is in standby mode. The data related to which programs are programs of interest, or favorite programs, may be stored in table 108 and may be drawn from table 108, bit stream 106, and/or elsewhere, by main processor 104 in the process of controlling LEDs 118.

As shown in FIG. 1, operation of visual alert system 100 provides both functional communication of events and aesthetic visual displays associated with events by drawing from data stored in table 108 and subsequently controlling LED display 118 in a prescribed manner as discussed above. This is all accomplished by main processor 104 through the decision process 110. Decision process 110 comprises instruction which at inquiry node 112 determine whether any event has occurred which warrants controlling the LED display 118 in a particular manner. If the answer to inquiry node 112 is a positive result 114, the main processor 104 controls the tuner of set-top box 102 and tunes the tuner to the channel or program associated with the event, if any, automatically showing the favorite program on any connected and powered on A/V equipment such as television 120 and saving the user the trouble of searching through programming not associated with the event. Also, when the answer to inquiry node 112 is a positive result 114, the main processor 104 turns on LED display 118 and controls it in the manner associated with that particular event as described above. In the case that the event is the occurrence of a favorite program, the LEDs may blink rapidly, scroll message text, or otherwise indicate the status of the favorite program in real-time. The LEDs 118 may be caused to blink at an increasingly rapid rate as the time before a favorite program is scheduled to begin decreases, providing a visual cue which allows the user to quickly gauge how soon the program will begin. Similarly, the LEDs 118 may be caused to display a countdown timer which presents the amount of time remaining before a favorite program is scheduled to begin. The LED 118 indication is helpful in the case that the user does not have the connected A/V equipment connected so that the user may be notified that an event is occurring and that it may be desirable to power on the connected A/V equipment such as television 120. Still referring to FIG. 1, in the case that the answer to inquiry node 112 is a negative result 122, the set-top box 102 remains in standby mode, and does not output a signal to the connected A/V devices such as television 120.

Still referring to FIG. 1, it is shown that input bit stream 106 is provided to main processor 104 of set-top box 102. As discussed above, a special event (news, weather, or other alert) may be sent to the main processor 104 through the input bit stream 106, causing a positive result 114 to inquiry node 112 and turning on the LED display 118 and/or the tuner as described above. Of course, in accordance with the above discussion, the LEDs 118 located on the front panel may optionally be controlled in accordance to other seasonal or holiday event data, whatever the source of the event, until a programming event (typically stored in the table 108) or a special event (typically originating from the bit stream 106). For example, LEDs 118 may simply display seasonal colors and/or figures while set-top box 102 is in standby mode until overridden by an event originating from table 108 or from the input bit stream 106.

Figure 2:
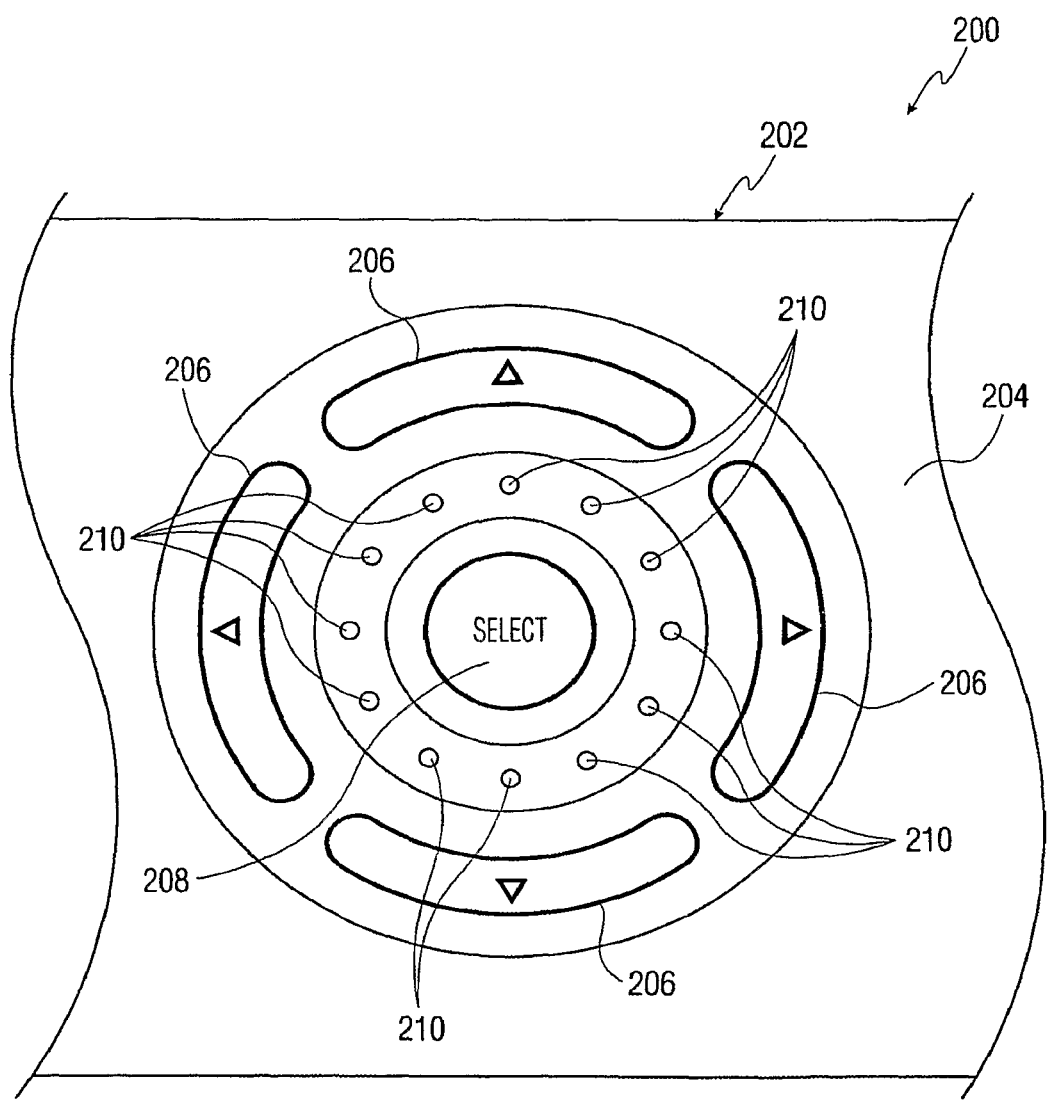
FIG. 2 is a schematic illustration of a set-top box front panel light emitting diode display according to a second embodiment of the present invention.

Referring now to FIG. 2 in the drawings, an LED display according to the present invention is illustrated. A set-top box front panel LED display system 200 comprises a set-top box 202 having a front panel 204 with directional button-switches 206 disposed in a circular pattern about a center button-switch 208. A radial array of 12 full color LEDs 210 are disposed evenly along a circular path between the directional button-switches 206 and the center button-switch 208 so as to form a ring of LEDs 210. Set-top box 202 is substantially similar in form and function to set-top box 102 and LEDs 210 operate together as a whole in a manner substantially similar to the above described operation of LEDs 118.

In sum, the present invention is directed to a visual display system for a set-top box having an objective of providing a system for communicating event data to a user of a set-top box even while the set-top box is in a standby mode. This object is met by providing a visual display system having a source of event data, a light emitting diode display, and a main processor configured to receive event data and control the light emitting diode display in response to the received event data, wherein the following advantages are achieved; communicating event data to a user of a set-top box even while the set-top box is in standby mode and providing an aesthetic visual display associated event data provided to the set-top box.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A visual alert system for a set-top box, comprising:
a light emitting diode display; and
a main processor configured to receive event data from a source and control the light emitting diode display in response to the received event data;
wherein the set-top box has a powered-on mode of operation and a standby mode of operation;
the light emitting diode display is operable in the standby mode of operation and the light emitting diode display is adapted to display event data signal to a user in the standby mode of operation; and
the event data are weather alerts, holiday or seasonal notices, or news events.

2. The visual alert system according to claim 1, further comprising:
a table configured to store event data and to provide event data to the main processor.

3. The visual alert system according to claim 1, wherein the source of event data is a table configured to store event data and to provide event data to the main processor.

4. The visual alert system according to claim 1, wherein the source of event data is an input bit stream.

5. The visual alert system according to claim 1, wherein the source of event data is separate from an input bit stream which provides audio/visual data for subsequent display on audio/visual display devices.

6. The visual alert system according to claim 1, wherein the light emitting diode display comprises at least one full color light emitting diode.

7. The visual alert system according to claim 1, wherein main processor controls the light emitting diode display in a manner responsive to the type of event data.

8. A set-top box, comprising:
a light emitting diode display; and
a main processor adapted to receive an input bit stream, receive event data, and control the light emitting diode display in response to the received event data;
wherein the set-top box has a powered-on mode of operation and a standby mode of operation;
the light emitting diode display is operable in the standby mode of operation and the light emitting diode display is adapted to display event data signal to a user in the standby mode of operation; and
the event data are weather alerts, holiday or seasonal notices, or news events.

9. The set-top box according to claim 8, further comprising:
a table for storing event data and providing event data to the main processor.

10. The set-top box according to claim 9, wherein at least some event data is capable of being created by a user of the set-top box.

11. The set-top box according to claim 8, wherein the main processor controls the light emitting diode in a manner responsive to the type of event data received.

12. The set-top box according to claim 8, wherein event data is received through the input bit stream.

13. The set-top box according to claim 8, wherein light emitting diode display comprises a radial array of light emitting diodes.

14. The set-top box according to claim 8, wherein at least one of the light emitting diodes is a multi-color light emitting diode.

15. The set-top box according to claim 8, wherein at least one of the light emitting diodes is a full color light emitting diode.

16. A set-top box, comprising:
a powered-on mode of operation and a standby mode of operation;
a light emitting diode display operable during the standby mode of operation and adapted to display event data signal to a user in the standby mode of operation;
a main processor adapted to receive event data and control the light emitting diode display in response to the received event data, wherein the event data are weather alerts, holiday or seasonal notices, or news events.

17. The set-top box according to claim 16, wherein the light emitting diode is further operable during the powered-on mode of operation.

18. The set-top box according to claim 16, wherein the main processor is configured to switch the set-top box from the standby mode of operation to the powered-on mode of operation in response to received event data.

19. The set-top box according to claim 16, wherein at least some event data is capable of being created by a user of the set-top box.

20. The set-top box according to claim 16, further comprising:
a table for storing event data and providing event data to the main processor.

\* \* \* \* \*